US010266635B2

(12) United States Patent
Otero Martinez et al.

(10) Patent No.: US 10,266,635 B2
(45) Date of Patent: Apr. 23, 2019

(54) POLYURETHANE FOAMS COMPRISING PHOSPHORUS COMPOUNDS

(71) Applicant: BASF SE, Ludwigshafen (DE)

(72) Inventors: Iran Otero Martinez, Stemwede (DE); Udo Hadick, Muenster (DE); Andre Meyer, Brockum (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/949,595

(22) Filed: Jul. 24, 2013

(65) Prior Publication Data

US 2014/0031444 A1 Jan. 30, 2014

Related U.S. Application Data

(60) Provisional application No. 61/676,365, filed on Jul. 27, 2012.

(51) Int. Cl.
| | |
|---|---|
| C08G 18/08 | (2006.01) |
| C08G 18/48 | (2006.01) |
| C08G 18/63 | (2006.01) |
| C08G 18/66 | (2006.01) |
| C08G 18/79 | (2006.01) |
| C08G 18/40 | (2006.01) |
| C08K 5/49 | (2006.01) |
| C08G 101/00 | (2006.01) |

(52) U.S. Cl.
CPC ......... C08G 18/14 (2013.01); C08G 18/4072 (2013.01); C08G 18/4837 (2013.01); C08G 18/632 (2013.01); C08G 18/6674 (2013.01); C08G 18/797 (2013.01); C08K 5/49 (2013.01); C08G 2101/0033 (2013.01); C08G 2101/0066 (2013.01)

(58) Field of Classification Search
CPC ............... C08G 18/14; C08G 18/4072; C08G 18/4837; C08G 18/632; C08G 18/6674; C08G 18/797; C08G 2101/00; C08G 2101/0033; C08G 2101/0058; C08G 2101/0066; C08G 2101/0083; C08J 9/0038; C08J 9/08; C08J 2203/02; C08J 2203/10; C08K 5/49; C08K 5/53; C08K 5/5205; C08K 5/521; C08K 5/523; C08K 5/524; C08K 5/526; C08K 5/5317; C08K 5/5333; C08K 5/5337; C08K 5/5353
See application file for complete search history.

(56) References Cited

U.S. PATENT DOCUMENTS

| | | |
|---|---|---|
| 3,304,273 A | 2/1967 | Stamberger |
| 3,383,351 A | 5/1968 | Stamberger |
| 3,523,093 A | 8/1970 | Stamberger |
| 4,338,408 A | 7/1982 | Zimmerman et al. |
| 5,739,173 A * | 4/1998 | Lutter et al. ............... 521/99 |
| 2006/0235098 A1* | 10/2006 | Burdeniuc et al. ......... 521/99 |
| 2007/0208097 A1 | 9/2007 | Zhao et al. |
| 2009/0170972 A1* | 7/2009 | Sonney et al. ............... 521/88 |

FOREIGN PATENT DOCUMENTS

| | | |
|---|---|---|
| CN | 1912001 A | 2/2007 |
| CN | 101851993 A | 10/2010 |
| DE | 111394 | 7/1900 |
| DE | 1 152 536 | 8/1963 |
| DE | 1 152 537 | 8/1963 |
| DE | 3435070 A1 | 4/1986 |
| EP | 0 250 351 A2 | 12/1987 |
| EP | 0635527 A1 | 1/1995 |
| EP | 1 888 664 B1 | 2/2010 |
| EP | 2292677 A1 | 3/2011 |
| EP | 2 374 843 A1 | 10/2011 |
| JP | 51-5358 A | 1/1976 |
| JP | 52-128997 | 10/1977 |
| JP | 53-85898 A | 7/1978 |
| JP | 2-88617 | 3/1990 |
| JP | 06-16760 A | 1/1994 |
| JP | 6-322062 | 11/1994 |
| JP | 8-217846 | 8/1996 |
| JP | 10-265540 A | 10/1998 |
| JP | 11-246754 | 9/1999 |
| JP | 2005-312548 A | 11/2005 |
| JP | 2008-195909 | 8/2008 |
| JP | 2008-266451 | 11/2008 |
| WO | WO 02/079340 A1 | 10/2002 |
| WO | WO 2004/081075 A1 | 9/2004 |
| WO | WO 2005/098763 A2 | 10/2005 |
| WO | WO 2009/065826 A1 | 5/2009 |

OTHER PUBLICATIONS

Office Action dated Apr. 18, 2017, in Japanese Patent Application No. 2015-523493 w/English-language translation.
Test Report w/Comparative Tests of EP 2877511 B1.

* cited by examiner

*Primary Examiner* — John M Cooney
(74) *Attorney, Agent, or Firm* — Oblon, McClelland, Maier & Neustadt, L.L.P.

(57) ABSTRACT

The present invention relates to polyurethanes obtained by mixing to give a reaction mixture of (a) polyisocyanate, (b) polymeric compounds having groups reactive toward isocyanates, (c) catalysts comprising incorporable amine catalysts, (d) phosphoric esters, polyphosphates, phosphonic esters, and/or phosphorous esters, and optionally (e) blowing agents, (f) chain extenders and/or crosslinking agents, and (h) auxiliaries and/or additives, and completing the reaction of the reaction mixture to give the polyurethane. The invention further relates to a process for producing these polyurethanes and to their use in automobile interiors.

12 Claims, No Drawings

POLYURETHANE FOAMS COMPRISING PHOSPHORUS COMPOUNDS

The present invention relates to polyurethane foams obtainable via mixing to give a reaction mixture of (a) polyisocyanate, (b) polymeric compounds having groups reactive toward isocyanates, (c) catalysts comprising incorporable amine catalysts, (d) phosphoric esters, polyphosphates, phosphonic esters, and/or phosphorous esters, (e) blowing agents comprising water, and optionally (f) chain extenders and/or crosslinking agents, and (h) auxiliaries and/or additives, and completing the reaction of the reaction mixture to give the polyurethane, where the phosphoric ester has the general formula $$(R^1-O)_3-P=O,$$

where the free moieties $R^1$ are mutually independently organic moieties which comprise one or more phenyl groups, one or more phosphoric acid groups or esters of these and/or one or more atoms selected from the group consisting of nitrogen, oxygen, fluorine, chlorine, and bromine, the polyphosphate has the general formula $$-[P(O)(O-R'^+)-O]_n-,$$

where n is integers from 2 to 10 000 and $R'^+$ is alkali metal cations or ammonium cations, the phosphonic ester has the general formula $$(R^3)(R^2-O)_2-P=O,$$

where the moieties $R^2$ are mutually independently organic moieties which comprise one or more atoms selected from the group consisting of nitrogen, oxygen, fluorine, chlorine, and bromine, and the moiety $R^3$ is either hydrogen or aromatic, aliphatic, or cycloaliphatic moieties having from 1 to 10 carbon atoms, and can comprise further heteroatoms, and the phosphorous ester has the general formula $$(R^4-O)_3-P,$$

where the moieties $R^4$ are mutually independently organic moieties which comprise one or more atoms selected from the group consisting of nitrogen, oxygen, fluorine, chlorine, and bromine. The invention further relates to a process for producing these polyurethane foams and to their use in the interiors of automobiles.

A feature of polyurethanes is a wide variety of possible uses. These materials are frequently used in particular in automobile construction, for example in external shell of automobiles as spoilers, roof elements, or spring elements, and also in the internal cladding of automobiles as roof cladding, foam backing for carpets, door cladding, steering wheels, control buttons, and seat cushioning. Polyurethanes used in the automobile sector, in particular in automobile interiors, are subject to stringent requirements placed on mechanical properties, and also placed upon aging resistance: important properties, such as sound-deadening, cushioning properties, or damping properties, must be retained in the event of a mechanical impact, for example of an accident, over the lifetime of an automobile.

Conditions that prevail in automobiles are extreme, and accelerate the aging of the polyurethane: temperatures in the region of minus 10° C. and lower, and also of more than 60° C., and in the presence of solar radiation even more than 100° C., are reached. The relative humidity can be up to 100%. This applies in particular to polyurethane foams which have significantly increased surface area when compared with the compact polyurethane.

Another requirement, in addition to said extreme conditions of temperature and humidity, is minimization of emissions of volatile compounds caused by polyurethanes used in automobile interiors. These derive mostly from the use of volatile amine catalysts. In order to reduce emissions, said volatile amine catalysts are replaced entirely or to some extent by incorporable catalysts. These compounds catalyze the polyurethane reaction, but at the same time also have groups reactive toward isocyanate groups, and the catalyst therefore becomes securely incorporated into the polyurethane. However, said incorporable catalysts mostly impair the mechanical properties of the resultant polyurethane, in particular after heat-aging or humid heat-aging, i.e. under the type of extreme conditions that can often occur in automobile interiors.

The use of flame retardants in polyurethanes is known: WO 2009065826 describes the use of alkyl phosphates for producing integral polyurethane foams, inter alia for use as steering wheels. WO 2009065826 does not describe the use of incorporable catalysts in combination with phosphoric esters.

EP 2374843 moreover describes the use of phosphoric esters in improving aging resistance in cable sheathing made of polyurethane. Zinc compounds and boron compounds are specified in that document as active substance.

It was an object of the present invention to improve the aging properties of polyurethane foams which comprise incorporable catalysts, in particular to improve heat-aging properties and humid heat-aging properties, without any substantial impairment of general mechanical properties after aging.

The object is achieved via polyurethane foams obtainable via mixing to give a reaction mixture of (a) polyisocyanate, (b) polymeric compounds having groups reactive toward isocyanates, (c) catalysts comprising incorporable amine catalysts, (d) phosphoric esters, polyphosphates, phosphonic esters, and/or phosphorous esters, and optionally (e) blowing agents comprising water, (f) chain extenders and/or crosslinking agents, and (h) auxiliaries and/or additives, and completing the reaction of the reaction mixture to give the polyurethane, where the phosphoric ester has the general formula $$(R^1-O)_3-P=O,$$

where the three moieties $R^1$ are mutually independently organic moieties which comprise one or more phenyl groups, one or more phosphoric acid groups or esters of these and/or one or more atoms selected from the group consisting of nitrogen, oxygen, fluorine, chlorine, and bromine, the polyphosphate has the general formula $$-[P(O)(O \cdot R'^+)-O]_n-,$$

where n is integers from 2 to 10 000 and $R'^+$ is alkali metal cations or ammonium cations, the phosphonic ester has the general formula $$(R^3)(R^2-O)_2-P=O,$$

where the moieties $R^2$ are mutually independently organic moieties which comprise one or more atoms selected from the group consisting of nitrogen, oxygen, fluorine, chlorine, and bromine, and the moiety $R^3$ is either hydrogen or aromatic, aliphatic, or cycloaliphatic moieties having from 1 to 10 carbon atoms, and the phosphorous ester has the general formula $$(R^4-O)_3-P,$$

where the moieties $R^4$ are mutually independently organic moieties which comprise one or more atoms selected from the group consisting of nitrogen, oxygen, fluorine, chlorine, and bromine.

The polyurethanes of the invention involve polyurethane foams, particularly preferably molded polyurethane foams. In particular, the polyurethanes of the invention involve integral foams, in particular those in accordance with DIN 7726 with a peripheral zone which, as a result of the shaping process, has higher density than the core.

The average density of the polyurethane foams of the invention is preferably from 100 to 800 g/L, particularly preferably from 150 to 500 g/L, and in particular from 200 to 400 g/L. If said foams have a skin, the density here involves the density averaged over the entire foam molding, i.e. over the core and the peripheral zone.

The organic and/or modified polyisocyanates (a) used to produce the integral polyurethane foams of the invention comprise the aliphatic, cycloaliphatic, and aromatic di- or polyfunctional isocyanates mainly from the prior art (constituent a-1), and also any desired mixture thereof. Examples are methanediphenyl 4,4'-diisocyanate, methanediphenyl 2,4'-diisocyanate, the mixtures of monomeric methanediphenyl diisocyanates, and homologues of methanediphenyl diisocyanate having a greater number of rings (polymer MDI), tetramethylene diisocyanate, hexamethylene diisocyanate (HDI), isophorone diisocyanate (IPDI), tolylene 2,4- or 2,6-diisocyanate (TDI), and mixtures of the isocyanates mentioned.

It is preferable to use 4,4'-MDI. The 4,4'-MDI preferably used can comprise from 0 to 20% by weight of 2,4'-MDI and small amounts, up to about 20% by weight, of allophanate- or uretonimine-modified polyisocyanates. It is also possible to use small amounts of polyphenylene polymethylene polyisocyanate (polymer MDI). The total amount of said high-functionality polyisocyanates should not exceed 5% by weight of the isocyanate used.

Polyisocyanate component (a) is preferably used in the form of polyisocyanate prepolymers. Said polyisocyanate prepolymers are obtainable by reacting polyisocyanate (a-1) described above with polyols (a-2), to give the prepolymer, for example at temperatures of from 30 to 100° C., preferably from about 80° C. The prepolymers of the invention are preferably produced by using 4,4'-MDI together with uretonimine-modified MDI and the commercially available polyols based on polyesters, for example starting from adipic acid, or polyethers, for example starting from ethylene oxide and/or propylene oxide.

Polyols (a-2) are known to the person skilled in the art and are described by way of example in "Kunststoffhandbuch, Band 7, Polyurethane" [Plastics handbook, volume 7, Polyurethanes], Carl Hanser Verlag, 3rd edition 1993, chapter 3.1. It is preferable here to use, as polyols (a-2), the high-molecular-weight compounds described under b) and having hydrogen atoms reactive toward isocyanates. It is particularly preferable to use polyesters as polyols (a-2).

Conventional chain extenders or crosslinking agents are optionally added to the polyols mentioned during the production of the isocyanate prepolymers. These substances are described under c) below. It is particularly preferable to use monoethylene glycol and 1,4-butanediol as chain extenders.

Relatively high-molecular-weight compounds b) having at least two hydrogen atoms reactive toward isocyanate groups can by way of example be polyetherols or polyesterols.

Polyetherols are produced by known processes, for example by anionic polymerization using alkali metal hydroxides or alkali metal alcoholates as catalysts, and with addition of at least one starter molecule which comprises from 2 to 3 reactive hydrogen atoms, or by cationic polymerization using Lewis acids, such as antimony pentachloride or boron fluoride etherate, from one or more alkylene oxides having from 2 to 4 carbon atoms in the alkylene moiety. Examples of suitable alkylene oxides are tetrahydrofuran, propylene 1,3-oxide, butylene 1,2- or 2,3-oxide, and preferably ethylene oxide and propylene 1,2-oxide. Other catalysts that can be used are multimetal cyanide compounds, known as DMC catalysts. The alkylene oxides can be used alone, in alternating succession, or in the form of a mixture. Preference is given to use of mixtures of propylene 1,2-oxide and ethylene oxide, where amounts of from 10 to 50% of the ethylene oxide are used as ethylene oxide end block ("EO cap"), so that the resultant polyols have more than 70% of primary OH end groups.

A starter molecule that can be used is water or di- or trihydric alcohols, such as ethylene glycol, 1,2- or 1,3-propanediol, diethylene glycol, dipropylene glycol, 1,4-butanediol, glycerol, or trimethylolpropane.

The functionality of the polyether polyols, preferably polyoxypropylene polyoxyethylene polyols, is preferably from 2 to 3, while their molar masses are from 1000 to 8000 g/mol, preferably from 2000 to 6000 g/mol.

Polyester polyols can by way of example be produced from organic dicarboxylic acids having from 2 to 12 carbon atoms, preferably aliphatic dicarboxylic acids having from 4 to 6 carbon atoms, and from polyhydric alcohols, preferably diols, having from 2 to 12 carbon atoms, preferably from 2 to 6 carbon atoms. Examples of dicarboxylic acids that can be used are: succinic acid, glutaric acid, adipic acid, suberic acid, azelaic acid, sebacic acid, decanedicarboxylic acid, maleic acid, fumaric acid, phthalic acid, isophthalic acid, and terephthalic acid. The dicarboxylic acids here can be used either individually or else in the form of a mixture with one another. It is also possible to use the corresponding dicarboxylic acid derivatives instead of the free dicarboxylic acids, examples being dicarboxylic esters of alcohols having from 1 to 4 carbon atoms, or dicarboxylic anhydrides. It is preferable to use dicarboxylic acid mixtures of succinic, glutaric, and adipic acid in quantitative proportions of, for example, from 20 to 35: from 35 to 50: from 20 to 32 parts by weight, and in particular adipic acid. Examples of di- and polyhydric alcohols, in particular diols, are: ethanediol, diethylene glycol, 1,2- and 1,3-propanediol, dipropylene glycol, 1,4-butanediol, 1,5-pentanediol, 1,6-hexanediol, 1,10-decanediol, glycerol, and trimethylolpropane. It is preferable to use ethanediol, diethylene glycol, 1,4-butanediol, 1,5-pentanediol, and 1,6-hexanediol. Other compounds that can be used are polyester polyols derived from lactones, e.g. □-caprolactone, or hydroxycarboxylic acids, e.g. □-hydroxycaproic acid.

To produce the polyester polyols, the organic, e.g. aromatic and preferably aliphatic, polycarboxylic acids and/or derivatives thereof, and polyhydric alcohols, can be polycondensed without catalyst or preferably in the presence of esterification catalysts, advantageously in an atmosphere of inert gas, e.g. nitrogen, carbon monoxide, helium, argon, inter alia, in the melt at temperatures of from 150 to 250° C., preferably from 180 to 220° C., optionally at reduced pressure, until the desired acid number has been reached, this preferably being smaller than 10, particularly preferably smaller than 2. In one preferred embodiment, the esterification mixture is polycondensed at the abovementioned temperatures until the acid number is from 80 to 30, preferably from 40 to 30, at atmospheric pressure, and then at a pressure smaller than 500 mbar, preferably from 50 to 150 mbar. Examples of esterification catalysts that can be used are iron catalysts, cadmium catalysts, cobalt catalysts, lead catalysts, zinc catalysts, antimony catalysts, magnesium catalysts, titanium catalysts, and tin catalysts, in the form of metals, of metal oxides, or of metal salts. However, the polycondensation reaction can also be carried out in the liquid phase in the presence of diluents and/or entrainers, e.g. benzene, toluene, xylene, or chlorobenzene for the removal of the water of condensation by azeotropic distillation. To produce the polyester polyols, the organic polycarboxylic acids and/or derivatives thereof, and the polyhydric alcohols, are advantageously polycondensed in a molar ratio of 1:from 1 to 1.8, preferably 1:from 1.05 to 1.2.

The resultant polyester polyols preferably have a functionality of from 2 to 4, in particular from 2 to 3, and a number-average molar mass of from 450 to 3000 g/mol, preferably from 1000 to 3000 g/mol.

Other suitable compounds b) of relatively high molecular weight having at least two hydrogen atoms reactive toward isocyanate are polymer-modified polyols, preferably polymer-modified polyesterols or polyetherols, particularly preferably graft polyetherols or graft polyesterols, in particular graft polyetherols. These are what are known as polymer polyols, usually having from 5 to 60% by weight, preferably from 10 to 55% by weight, particularly preferably from 30 to 55% by weight, and in particular from 40 to 50% by weight, content of polymers which are preferably thermoplastic. Said polymer polyesterols are described by way of example in WO 05/098763 and EP-A-250 351, and are usually produced via free-radical polymerization of suitable olefinic monomers, such as styrene, acrylonitrile, (meth)acrylates, (meth)acrylic acid, and/or acrylamide, in a polyesterol serving as graft base. The side chains are generally produced via transfer of the free radicals from growing polymer chains onto polyesterols or polyetherols. The polymer polyol comprises, alongside the graft copolymer, mainly the homopolymers of the olefins, dispersed in unaltered polyesterol and, respectively, polyetherol.

In one preferred embodiment, the monomers used comprise acrylonitrile, styrene, acrylonitrile and styrene, and particular preference is given to exclusive use of styrene. The monomers are polymerized optionally in the presence of further monomers, of a macromer, of a moderator, and with use of a free-radical initiator, mostly azo compounds or peroxide compounds, in a polyesterol or polyetherol as continuous phase. This process is described by way of example in DE 111 394, U.S. Pat. No. 3,304,273, U.S. Pat. No. 3,383,351, U.S. Pat. No. 3,523,093, DE 1 152 536, and DE 1 152 537.

During the free-radical polymerization reaction, the macromers are concomitantly incorporated into the copolymer chain. This gives block copolymers having a polyester block and, respectively, polyether block, and having a polyacrylonitrile-styrene block, where these act as compatibilizer in the boundary between continuous phase and disperse phase, and suppress agglomeration of the polymer polyesterol particles. The proportion of the macromers is usually from 1 to 20% by weight, based on the total weight of the monomers used to produce the polymer polyol.

If the compound b) of relatively high molecular weight comprises polymer polyol, this is preferably present together with further polyols, for example polyetherols, polyesterols, or a mixture of polyetherols and polyesterols. It is particularly preferable that the proportion of polymer polyol is greater than 5% by weight, based on the total weight of component (b). By way of example, the amount comprised of the polymer polyols can be from 7 to 90% by weight, or from 11 to 80% by weight, based on the total weight of component (b). It is particularly preferable that the polymer polyol involves polymer polyesterol or polymer polyetherol.

Catalysts c) greatly accelerate the reaction of the polyols (b) and optionally chain extenders and crosslinking agents (d), and also chemical blowing agents (e) with the organic, optionally modified polyisocyanates (a). The catalysts (c) here comprise incorporable amine catalysts. These have at least one, preferably from 1 to 8, and particularly preferably from 1 to 2, groups which are reactive toward isocyanates and which are preferably OH, NH, or $NH_2$ groups. Incorporable amine catalysts are used mostly for producing low-emission polyurethane foams, where these are in particular used in the automobile interior sector. These catalysts are known and are described by way of example in EP1888664. These materials comprise compounds which preferably have one or more tertiary amino groups, alongside the group(s) reactive toward isocyanates. It is preferable that the tertiary amino groups of the incorporable catalysts bear at least two aliphatic hydrocarbon moieties, preferably having from 1 to 10 carbon atoms per moiety, particularly preferably having from 1 to 6 carbon atoms per moiety. It is particularly preferable that the tertiary amino groups bear two moieties mutually independently selected from methyl moiety and ethyl moiety, and also bear another organic moiety. Examples of incorporable catalysts that can be used are bisdimethylaminopropylurea, bis(N,N-dimethylaminoethoxyethyl) carbamate, dimethylaminopropylurea, N,N,N-trimethyl-N-hydroxyethylbis(aminopropyl ether), N,N,N-trimethyl-N-hydroxyethylbis(aminoethyl ether), diethylethanolamine, bis(N,N-dimethyl-3-aminopropyl)amine, dimethylaminopropylamine, 3-dimethyaminopropyl-N,N-dimethylpropane-1,3-diamine, dimethyl-2-(2-aminoethoxyethanol), and (1,3-bis(dimethylamino)propan-2-ol), N,N-bis(3-dimethylaminopropyl)-N-isopropanolamine, bis(dimethlyaminopropyl)-2-hydroxyethylamine, N,N,N-trimethyl-N-(3-aminopropyl)bis(aminoethyl) ether, 3-dimethylaminoisopropyldiisopropanolamine, and mixtures thereof.

It is also possible to use conventional catalysts, alongside the incorporable amine catalyst, to produce the polyurethanes. Mention may be made by way of example of amidines, such as 2,3-dimethyl-3,4,5,6-tetrahydropyrimidine, tertiary amines, such as triethylamine, tributylamine, dimethylbenzylamine, N-methyl-, N-ethyl-, and N-cyclohexylmorpholine, N,N,N',N'-tetramethylethylenediamine, N,N,N',N'-tetramethylbutanediamine, N,N,N',N'-tetramethylhexanediamine, pentamethyldiethylenetriamine, tetramethyldiaminoethyl ether, bis(dimethylaminopropyl)urea, dimethylpiperazine, 1,2-dimethylimidazole, 1-azabicyclo[3.3.0]octane, and preferably 1,4-diazabicyclo[2.2.2]octane, and alkanolamine compounds, such as triethanolamine, triisopropanolamine, N-methyl- and N-ethyldiethanolamine, and dimethylethanolamine. It is also possible to use organometallic compounds, preferably organotin compounds, such as tin(II) salts of organic carboxylic acids, e.g. tin(II) acetate, tin(II) octoate, tin(II) ethylhexoate, and tin(II) laurate, and the dialkyltin(IV) salts of organic carboxylic acids, e.g. dibutyltin diacetate, dibutyltin dilaurate, dibutyltin maleate, and dioctyltin diacetate, and also bismuth carboxylates, such as bismuth(III) neodecanoate, bismuth 2-ethylhexanoate, and bismuth octanoate, or a mixture thereof. The organometallic compounds can be used alone or preferably in combination with strongly basic amines. If component (b) involves an ester, it is preferable to use exclusively amine catalysts. In a particularly preferred embodiment, catalysts (c) used comprises exclusively incorporable catalysts.

Component (d) comprises phosphoric esters, polyphosphates, phosphonic esters, and/or phosphorous esters. The molar mass of these is preferably at least 350 g/mol. Likewise preferred are phosphoric esters, phosphonic esters, and/or phosphorous esters, where these have at least one group which is reactive towards isocyanates and which is by way of example an OH group.

Phosphoric esters used here comprise esters of phosphoric acid which have the general formula (R$^1$—O)$_3$—P═O, where the free moieties R$^1$ are mutually independently organic moieties which comprise one or more phenyl groups, one or more phenyl groups, one or more phosphoric acid groups or esters of these and/or one or more atoms selected from the group consisting of nitrogen, oxygen, fluorine, chlorine, and bromine. The moieties R$^1$ here respectively preferably comprise mutually independently from 1 to 20, particularly preferably from 2 to 10, and in particular from 2 to 5, carbon atoms, and preferably have branching; said moieties are preferably aliphatic. Preference is given to moieties which have chlorine atoms or oxygen atoms, for example in the form of OH end groups. Examples of the moieties R$^1$ are ethylene chloride, propylene chloride, butylene chloride, ethylene oxide, propylene oxide, butylene oxide, and polyethylalkylene oxides preferably having from 2 to 10 repeating units.

It is preferable that the phosphoric esters of the invention comprise at least two, preferably from 2 to 50, particularly preferably from 2 to 20, phosphate groups within a molecule, where these have bonding via polyfunctional moieties, in particular via difunctional moieties —R''—. R'' here is an organic moiety having from 1 to 20, preferably from 2 to 10, and in particular from 2 to 5, carbon atoms, where these can be linear or branched, preferably branched, and optionally comprise one or more atoms selected from the group consisting of nitrogen, oxygen, fluorine, chlorine, and bromine. These phosphoric esters according to the invention comprise by way of example 2,2-bis(chloromethyl)trimethylenebis(bis(2-chloroethyl) phosphate), tris(2-butoxyethyl) phosphate, tris(1,3-dichloro-2-isopropyl) phosphate, tris(2-chlorisopropyl) phosphate, and oligomeric alkyl phosphates having ethylene oxide bridges, for example Fyrol® PNX from ICL Industrial Products.

Polyphosphates of the invention are compounds of the general formula

—[P(O)(O—R'$^+$)O]$_n$—, where n is integers from 2 to 10 000 and is alkali metal cations or ammonium cations. Any desired structures can serve as end groups, preferably structures of the general formula

—O—P(O)(O—R'$^+$)$_2$, where R'$^+$ is as defined above. By way of example, ammonium polyphosphate can be used as polyphosphate.

Phosphonic esters of the invention are compounds which have the general formula (R$^3$)(R$^2$—O)$_2$—P═O, where the moieties R$^2$ are mutually independently organic moieties which comprise one or more atoms selected from the group consisting of nitrogen, oxygen, fluorine, chlorine, and bromine, and preferably have branching, and the moiety R$^3$ is either hydrogen or aromatic, aliphatic, or cycloaliphatic moieties having from 1 to 10, preferably from 1 to 5, and in particular from 1 to 3, carbon atoms, where these optionally also comprise heteroatoms.

The moieties R$^2$ here respectively preferably comprise mutually independently from 1 to 20, particularly preferably from 2 to 10, and in particular from 2 to 5 carbon atoms. Preference is given to moieties which comprise chlorine atoms or oxygen atoms, for example in the form of OH end groups. Examples of the moieties R$^2$ are ethylene chloride, propylene chloride, butylene chloride, ethylene oxide, propylene oxide, butylene oxide, and polyethylalkylene oxides preferably having from 2 to 10 repeating units. An example of a phosphonic ester of the invention is di(diethylene glycol) methylphosphonate.

Phosphorous esters used comprise compounds of the general formula (R$^4$—O)$_3$—P, where the moieties R$^4$ are mutually independently organic moieties which comprise one or more atoms selected from the group consisting of nitrogen, oxygen, fluorine, chlorine, and bromine. Preference is given to moieties which comprise chlorine atoms or oxygen atoms, for example in the form of OH end groups. The moieties R$^4$ here respectively preferably comprise mutually independently from 1 to 20, particularly preferably from 2 to 10, and in particular from 2 to 5, carbon atoms. Preference is given to moieties which comprise chlorine atoms or oxygen atoms, for example in the form of OH end groups. In particular, phosphites comprise OH end groups. Examples of the moieties R$^4$ are ethylene chloride, propylene chloride, butylene chloride, ethylene oxide, propylene oxide, butylene oxide, and polyethylalkylene oxides preferably having from 2 to 10 repeating units. By way of example tris(dipropylene glycol) phosphite is used as the phosphorous ester.

Particularly preferred components (d) are phosphoric esters, phosphonic esters, and/or phosphorous esters, and more preferably compounds which comprise at least two phosphate groups in the molecule. Examples are 2,2-bis (chloromethyl)trimethylenebis(bis(2-chloroethyl) phosphate), ammonium polyphosphate, and polyalkyl phosphate having ethylene oxide bridges. Preference is further given to tris(1,3-dichloro-2-isopropyl) phosphate, tris(2-chloroisopropyl) phosphate, tris(2-butoxyethyl) phosphate, oligomeric alkyl phosphates having ethylene oxide bridges, and di(diethylene glycol) methylphosphonate. Very particular preference is given to 2,2-bis(chloromethyl)trimethylenebis (bis(2-chloroethyl) phosphate), di(diethylene glycol) methylphosphonate, tris(1,3-dichloro-2-isopropyl) phosphate, oligomeric alkyl phosphates having ethylene oxide bridges, and ammonium polyphosphate. In particular, preference is given to 2,2-bis(chloromethyl)trimethylenebis(bis(2-chloroethyl) phosphate) and oligomeric alkyl phosphates having ethylene oxide bridges. These compounds are available commercially.

The proportion of component (d) here, based on the total weight of components (a) to (f), is preferably smaller than 3% by weight, particularly preferably from 0.05 to 2%, more preferably from 0.1 to 1.5%, and in particular from 0.15 to 1.0%, based in each case on the total weight of components (a) to (f). Even a preferred proportion of from 0.1 to 0.4%, or a particularly preferred proportion of from 0.15 to 0.3%, of component (d), based in each case on the total weight of components (a) to (f) is sufficient to improve heat-aging. It is particularly preferable that the polyurethane foams of the invention comprise less than 5% of, more preferably less than 2% of, even more preferably less than 1% of, and in particular no, other substances that are usually used as flame retardants in polyurethane foams.

Blowing agents (e) are also present during the production of polyurethane foams. Said blowing agents (e) comprise water. Blowing agents (e) that can be used comprise not only water but also well-known compounds having chemical and/or physical effect. Chemical blowing agents are compounds which use reaction with isocyanate to form gaseous products, an example being water or formic acid. Physical blowing agents are compounds which have been emulsified or dissolved in the starting materials for polyurethane production and which vaporize under the conditions of polyurethane formation. By way of example, these involve hydrocarbons, halogenated hydrocarbons, and other compounds, for example perfluorinated alkanes, such as perfluorohexane, chlorofluorocarbons, and ethers, esters, ketones, acetals, and mixtures thereof, for example cyclo)aliphatic hydrocarbons having from 4 to 8 carbon atoms, or fluorocarbons, such as Solkane® 365 mfc from Solvay Fluorides LLC. A preferred embodiment uses, as blowing agent, a mixture comprising at least one of said blowing agents and water, and in particular water as sole blowing agent.

In one preferred embodiment, the content of water is from 0.1 to 2% by weight, preferably from 0.2 to 1.5% by weight, particularly preferably from 0.3 to 1.2% by weight, in particular from 0.4 to 1% by weight, based on the total weight of components (a) to (g).

Chain extenders and/or crosslinking agents (f) used comprise substances with a molar mass that is preferably smaller than 500 g/mol, particularly preferably from 60 to 400 g/mol, where chain extenders have 2 hydrogen atoms reactive toward isocyanates and crosslinking agents have 3 hydrogen atoms reactive toward isocyanate. These can be used individually or preferably in the form of a mixture. It is preferable to use diols and/or triols with the molecular weights smaller than 400, particularly preferably from 60 to 300 and in particular from 60 to 150. Examples of chain extenders and crosslinking agents that can be used are aliphatic, cyclo)aliphatic, and/or araliphatic diols having from 2 to 14, preferably from 2 to 10, carbon atoms, for example ethylene glycol, 1,3-propanediol, 1,10-decanediol, 1,2-, 1,3-, 1,4-dihydroxycyclohexane, diethylene glycol, dipropylene glycol, and preferably 1,4-butanediol, 1,6-hexanediol, and bis(2-hydroxyethyl)hydroquinone, triols, such as 1,2,4- or 1,3,5-trihydroxycyclohexane, glycerol, and trimethylolpropane, and low-molecular-weight hydroxylated polyalkylene oxides based on ethylene oxide and/or based on propylene 1,2-oxide and on the abovementioned diols and/or triols as starter molecules. Chain extender (c) used particularly preferably comprises monoethylene glycol, 1,4-butanediol, glycerol, or a mixture thereof, and in particular monoethylene glycol or a mixture comprising monoethylene glycol.

To the extent that chain extender, crosslinking agent, or a mixture thereof is used, amounts advantageously used of these are from 1 to 60% by weight, preferably from 1.5 to 50% by weight, and in particular from 2 to 40% by weight, based on the weight of components (b) and (c).

Auxiliaries and/or additives (g) can also optionally be added to the reaction mixture for producing the polyurethane foams. Mention may be made by way of example of surfactant substances, foam stabilizers, cell regulators, release agents, rubber vulcanization aids, fillers, dyes, pigments, hydrolysis stabilizers, odor-absorbing substances, and fungistatic and/or bacteriostatic substances. These are known and are usually used during the production of polyurethane foams.

The invention also provides a process for producing the polyurethane foams of the invention, by mixing components (a) to (d) and optionally (e) to (g) to give a reaction mixture and then completing the reaction thereof to give the polyurethane. The materials are preferably mixed with one another in amounts such that the equivalence ratio of NCO groups of the polyisocyanates (a) to the entirety of the reactive hydrogen atoms of components (b), (c), and (d) is from 1:0.8 to 1:1.25, preferably from 1:0.9 to 1:1.15.

The integral polyurethane foams preferred according to the invention are preferably produced by the one-shot process with the aid of low-pressure or high-pressure technology in closed, advantageously temperature-controlled, molds. The molds are usually composed of metal, e.g. aluminum or steel. These procedures are described by way of example by Piechota and Röhr in "Integralschaumstoff" [Integral foam], Carl-Hanser-Verlag, Munich, Vienna, 1975, or in "Kunststoff-handbuch"[Plastics handbook], volume 7, Polyurethane [Polyurethanes], 3rd edition, 1993, chapter 7.

To this end, the starting components are preferably mixed at a temperature of from 15 to 90° C., particularly preferably from 25 to 55° C., and the reaction mixture is introduced optionally under elevated pressure into the closed mold. The mixing can be carried out mechanically by means of a stirrer or of a mixing screw or under high pressure in what is known as the countercurrent injection process. The mold temperature is advantageously from 20 to 160° C., preferably from 30 to 120° C., particularly preferably from 30 to 60° C. For the purposes of the invention, the term reaction mixture is used here for the mixture of components (a) to (g) at reaction conversions smaller than 90%, based on the isocyanate groups.

The amount of the reaction mixture introduced into the mold is such that the density of the resulting moldings made of integral foams is preferably from 0.08 to 0.75 g/cm$^3$, particularly preferably from 0.15 to 0.75 g/cm$^3$, and in particular from 0.25 to 0.70 g/cm$^3$. The compaction levels used for producing the integral polyurethane foams of the invention are in the range from 1.1 to 8.5, preferably from 2.1 to 7.0.

The polyurethane foams of the invention are preferably used in automobile interiors. It is preferable that automobile interior components, for example steering wheels, dashboards, door cladding, headrests, or control buttons, are involved here. Polyurethane foams of the invention here exhibit superior aging performance, in particular on heat-aging over 7 days at 140° C. or humid heat-aging over 3 cycles of 5 hours in an autoclave at 120° C. and 100% relative humidity. Particular improvements here are seen in tensile strength in maximum tensile strain.

Determination of heat-aging and of humid heat-aging here was carried out in accordance with DIN EN ISO 2440.

Examples are used below to illustrate the invention.
Starting Materials:
Polyol A: Polyetherol with OH number 35 mg KOH/g and functionality 2.7, based on ethylene oxide and propylene oxide, having 84% propylene oxide content and 14% ethylene oxide content
Polyol B: Graft polyol having 45% solids content (styrene-acrylonitrile) in polyol A as carrier polyol
MEG: Monoethylene glycol
Isopur SA-21050: Black paste from ISL-Chemie
Polycat 15: Catalyst from Air Products
Jeffcat ZF-10: Catalyst from Huntsman Phosphorus Compounds
P1: Tris(1,3-dichloro-2-isopropyl) phosphate
P2: Oligomeric alkyl phosphate having ethylene oxide bridges
P3: Di(diethylene glycol) methylphosphonate
P4: Exolit® AP422—ammonium polyphosphate from Clariant
P5: Isopropylated triaryl phosphate
P6: Tris(dipropylene glycol) phosphite
P7: Tris(2-butoxyethyl) phosphate
P8: Tris(2-chloroisopropyl) phosphate, TCPP
P9: Tributyl phosphate (comparison)
P10: Tributyl phosphite (comparison)
P11: Trisnonylphenyl phosphite, TNPP (comparison)
P12: Disflamoll® TOF—tris(2-ethylhexyl) phosphate (comparison), aliphatic phosphate from Lanxess Isocyanate
Carbodiimide-modified 4,4'-MDI with an NCO content of 27.8

The mixture A was prepared by blending the following components:

| | |
|---|---|
| 79.9 | parts of polyol A |
| 4.8 | parts of polyol B |
| 8.1 | parts of MEG |
| 5.0 | parts of Isopur SA-21050 |
| 0.6 | parts of water |
| 0.8 | parts of Polycat 15 |
| 0.8 | parts of Jeffcat ZF-10 | from 0.25 to 2 parts of phosphorus compounds (see table)

The mixture A and the isocyanate component were mixed with one another at an isocyanate index of 102 and charged to a closed mold, thus giving moldings with average density 380 g/L. The procedures for determining the values measured for mechanical properties were in accordance with the following standards.

| Property | Dimension | DIN standard |
|---|---|---|
| Hardness | Shore A | 53505 |
| Tensile strength | MPa | 1798 |
| Tensile strain | % | 1798 |
| Density | g/mm³ | 845 |

Heat-aging and of humid heat-aging here was carried out in accordance with DIN EN ISO 2440.

TABLE 1

Mechanical properties of the resultant integral foams prior to and after aging over 7 days at 140° C. with addition of the respective phosphorus compounds P1 to P7 in the concentrations stated, in each case given in parts by weight, based on the total weight of the mixture A, and also without addition of phosphorus compounds (Ref.).

| Property | | Ref. | P1 0.5 pt. | P2 0.5 pt. | P3 0.5 pt. |
|---|---|---|---|---|---|
| Tensile strength MPa | 0 values | 2306 | 2412 | 2185 | 2586 |
| | Final values | 1201 | 2195 | 1838 | 2264 |
| | Change | −48% | −9% | −16% | −13% |
| Tensile strain % | 0 values | 94 | 116 | 91 | 93 |
| | Final values | 13 | 135 | 109 | 67 |
| | Change | −86% | +16% | +20% | −28% |

| Property | | P4 1.0 pt. | P5 1.0 pt. | P6 1.0 pt. | P7 1.0 pt. |
|---|---|---|---|---|---|
| Tensile strength MPa | 0 values | 2240 | 2346 | 2332 | 2397 |
| | Final values | 1955 | 1739 | 1919 | 1894 |
| | Change | −13% | −26% | −18% | −21% |
| Tensile strain % | 0 values | 97 | 105 | 105 | 110 |
| | Final values | 120 | 101 | 111 | 112 |
| | Change | +24% | −4% | +6% | +2% |

TABLE 2

Mechanical properties of the resultant integral foams prior to and after aging over 7 days at 140° C. with addition of the respective phosphorus compounds P8 to P12 in the concentrations stated, in each case given in parts by weight, based on the total weight of the mixture A.

| Property | | P8 0.5 pt. | P8 1.0 pt. | P9 1.0 pt. | P10 1.0 pt. | P11 1.0 pt. | P12 1.0 pt. |
|---|---|---|---|---|---|---|---|
| Tensile strength MPa | 0 values | 2266 | 2272 | 2260 | 2297 | 2218 | 2222 |
| | Final values | 1131 | 1681 | 1373 | 1256 | 1338 | 1217 |
| | Change | −51% | −26% | −39% | −45% | −40% | −45% |
| Tensile strain % | 0 values | 105 | 101 | 98 | 100 | 93 | 92 |
| | Final values | 29 | 96 | 59 | 47 | 68 | 41 |
| | Change | −73% | −5% | −40% | −53% | −27% | −55% |

TABLE 3

Mechanical properties of the resultant integral foams prior to and after humid heat-aging over 3 cycles of 5 hours at 120° C. and 100% humidity in an autoclave with addition of the respective phosphorus compounds P1 to P4 in the concentrations stated, in each case given in parts by weight, based on the total weight of the mixture A, and also without addition of phosphorus compounds (Ref.).

| Property | | Ref. | P2 1.0 pt. | P3 1.0 pt. | P4 1.0 pt. |
|---|---|---|---|---|---|
| Tensile strength MPa | 0 values | 2306 | 2260 | 2337 | 2240 |
| | Final values | 1298 | 1520 | 1504 | 1801 |
| | Change | −44% | −33% | −36% | −20% |
| Tensile strain % | 0 values | 94 | 102 | 93 | 97 |
| | Final values | 74 | 139 | 144 | 148 |

TABLE 3-continued

Mechanical properties of the resultant integral foams prior to and after humid heat-aging over 3 cycles of 5 hours at 120° C. and 100% humidity in an autoclave with addition of the respective phosphorus compounds P1 to P4 in the concentrations stated, in each case given in parts by weight, based on the total weight of the mixture A, and also without addition of phosphorus compounds (Ref.).

| | Change | −20% | +36% | +55% | +52% |
|---|---|---|---|---|---|
| | Property | | P1 2.0 pt. | P2 2.0 pt. | |
| Tensile strength MPa | 0 values | | 2115 | 2011 | |
| | Final values | | 1461 | 1640 | |
| | Change | | −31% | −18% | |
| Tensile strain % | 0 values | | 116 | 97 | |
| | Final values | | 117 | 147 | |
| | Change | | +0% | +51% | |

TABLE 4

Mechanical properties of the resultant integral foams prior to and after aging over 7 days at 140° C. with addition of the respective phosphorus compounds P9 to P12 in the concentrations stated, in each case given in parts by weight, based on the total weight of the mixture A.

| Property | | P9 1.0 pt. | P10 1.0 pt. | P11 1.0 pt. | P12 1.0 pt. |
|---|---|---|---|---|---|
| Tensile strength MPa | 0 values | 2260 | 2297 | 2218 | 2222 |
| | Final values | 1374 | 1341 | 1301 | 1084 |
| | Change | −39% | −42% | −41% | −51% |
| Tensile strain % | 0 values | 98 | 100 | 93 | 92 |
| | Final values | 117 | 123 | 109 | 92 |
| | Change | +19% | +23% | +17% | 0% |

Finally, steering wheels were produced starting from the mixtures A and from the isocyanate with use of respectively 0.5 part by weight of the phosphorus compounds P1, P2 and P3, based on the total weight of the mixture A, and also, as reference, without the use of phosphorus compound, and the steering wheels were aged at 140° C. for 7 days. The polyurethane in the steering wheel here without phosphorus compound is fragile and in part crumbles away, whereas the polyurethane of the steering wheels produced according to the invention is visually unchanged.

The invention claimed is:

1. A polyurethane foam obtained by a process comprising: mixing a reaction mixture comprising
(a) polyisocyanate,
(b) a polymeric compound comprising a group reactive toward isocyanates,
(c) a catalyst composition consisting of at least one reactive amine catalyst and optionally one or more organometallic compounds,
(d) at least one of a phosphoric ester, a polyphosphate, a phosphonic ester, and a phosphorous ester,
(e) a blowing agent comprising water,
(f) optionally a chain extender, a crosslinking agent, or both, and
(g) optionally an additive, and
reacting the reaction mixture to give the polyurethane foam,
wherein
the phosphoric ester has formula $(R^1-O)_3-P=O$, wherein moieties $R^1$ are independently organic moieties comprising one or more phenyl groups, one or more phosphoric acid groups or esters comprising the phenyl groups, the phosphoric acid groups, and optionally one or more atoms selected from the group consisting of nitrogen, oxygen, fluorine, chlorine, and bromine,
the polyphosphate has formula $-[P(O)(O-R'^+)-O]_n-$, wherein n is an integer of from 2 to 10 000 and $R'^+$ is an alkali metal cation or an ammonium cation,
the phosphonic ester has formula $(R^3)(R^2-O)_2-P=O$, wherein moieties $R^2$ are independently organic moieties comprising one or more atoms selected from the group consisting of nitrogen, oxygen, fluorine, chlorine, and bromine, and moiety $R^3$ is either hydrogen or aromatic, aliphatic, or cycloaliphatic moieties comprising from 1 to 10 carbon atoms,
the phosphorous ester has formula $(R^4-O)_3-P$, wherein moieties $R^4$ are independently organic moieties comprising one or more atoms selected from the group consisting of nitrogen, oxygen, fluorine, chlorine, and bromine, wherein at least one of the phosphoric ester, the phosphonic ester, or the phosphorus ester is present and comprises a group which is reactive towards an isocyanate group
wherein a proportion of component (d), based on a total volume of components (a) to (f), is smaller than 3% by weight; and
wherein said reactive amine catalyst comprises groups reactive toward isocyanates, and optionally at least one tertiary aliphatic amino group comprising two moieties independently selected from the group consisting of a methyl moiety and an ethyl moiety, and an organic moiety; and
wherein said polyurethane foam comprises less than 2% of further flame retardants.

2. The polyurethane foam according to claim 1, wherein the group of the phosphoric ester, the phosphonic ester, or the phosphorous ester which is reactive toward an isocyanate group comprises a group which is an OH group.

3. The polyurethane foam according to claim 1, wherein component (d) comprises compounds comprising at least two phosphate groups.

4. The polyurethane foam according to claim 1, wherein the polyurethane foam has an average density of from 100 to 850 g/L.

5. The polyurethane foam according to claim 4, wherein the polyurethane foam is a molded polyurethane foam.

6. The polyurethane foam according to claim 5, wherein the molded polyurethane foam has an average density of from 150 to 500 g/L.

7. The polyurethane foam according to claim 1, wherein the polyurethane foam is an automobile interior part.

8. The polyurethane foam according to claim 7, wherein the automobile interior part is a steering wheel, a dashboard, an interior door cladding, a headrest, or a control button.

9. The polyurethane foam according to claim 1, comprising no further flame retardants.

10. A process for producing a polyurethane foam, the process comprising:
mixing
a) polyisocyanate,
b) polymeric compounds comprising groups reactive toward isocyanates, c) a catalyst composition consisting of at least one reactive amine catalyst and optionally one or more organometallic compounds,
d) at least one of a phosphoric ester, a polyphosphate, a phosphonic ester, and a phosphorous ester,
e) blowing agents comprising water,
f) optionally chain extenders, crosslinking agents, or both, and
g) optionally additives,
thereby obtaining a reaction mixture, and
reacting the reaction mixture, thereby obtaining the polyurethane foam,
wherein
the phosphoric ester has formula $(R^1\text{—O})_3\text{—P=O},$ wherein moieties $R^1$ are independently organic moieties comprising one or more phenyl groups, one or more phosphoric acid groups or esters comprising the phenyl groups, the phosphoric acid groups, and optionally one or more atoms selected from the group consisting of nitrogen, oxygen, fluorine, chlorine, and bromine,
the polyphosphate has formula $\text{—[P(O)(O—R'^+)—O]}_n\text{—},$ wherein n is an integer of from 2 to 10 000 and $R'^+$ is an alkali metal cation or an ammonium cation,
the phosphonic ester has formula $(R^3)(R^2\text{—O})_2\text{—P=O},$ wherein moieties $R^2$ are independently organic moieties comprising one or more atoms selected from the group consisting of nitrogen, oxygen, fluorine, chlorine, and bromine, and moiety $R^3$ is either hydrogen or aromatic, aliphatic, or cycloaliphatic moieties comprising from 1 to 10 carbon atoms,
the phosphorous ester has formula $(R^4\text{—O})_3\text{—P},$ wherein moieties $R^4$ are independently organic moieties comprising one or more atoms selected from the group consisting of nitrogen, oxygen, fluorine, chlorine, and bromine, wherein at least one of the phosphoric ester, the phosphonic ester, or the phosphorus ester is present and comprises a group which is reactive towards an isocyanate group
wherein a proportion of component (d), based on a total volume of components (a) to (f), is smaller than 3% by weight; and
wherein said reactive amine catalyst comprises groups reactive toward isocyanates, and optionally at least one tertiary aliphatic amino group comprising two moieties independently selected from the group consisting of a methyl moiety and an ethyl moiety, and an organic moiety; and
wherein said polyurethane foam comprises less than 2% of further flame retardants.

11. A method for making an automobile interior, comprising:
employing the polyurethane foam according to claim 1 in an automobile interior in need thereof.

12. The polyurethane foam according to claim 1, wherein said polyurethane foam comprises less than 1% of further flame retardants.

* * * * *

UNITED STATES PATENT AND TRADEMARK OFFICE
CERTIFICATE OF CORRECTION

PATENT NO. : 10,266,635 B2
APPLICATION NO. : 13/949595
DATED : April 23, 2019
INVENTOR(S) : Iran Otero Martinez et al.

Page 1 of 1

It is certified that error appears in the above-identified patent and that said Letters Patent is hereby corrected as shown below:

In the Specification

Column 2, Line 53, "$(O \cdot R'^{+})$" should read --$(O - R'^{+})$--

Column 7, Line 50, "and is" should read --and $R'^{+}$ is--

Column 10, Line 17, "and" should read --und--

Signed and Sealed this
Twenty-sixth Day of November, 2019

Andrei Iancu
*Director of the United States Patent and Trademark Office*